Jan. 23, 1951     H. E. KARIG     2,538,785
APPARATUS FOR MEASURING JET REACTION OF A NOZZLE
Filed May 10, 1948
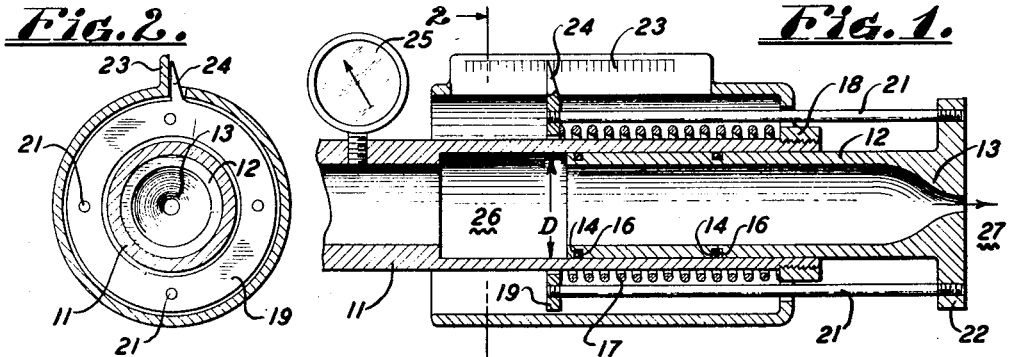
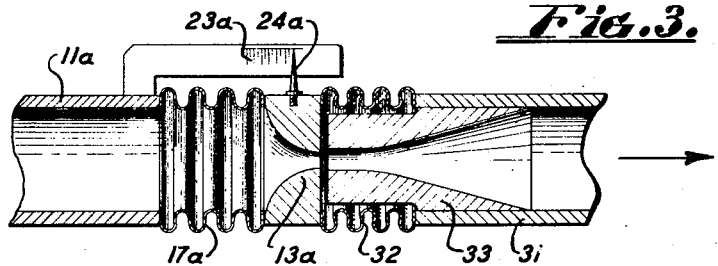
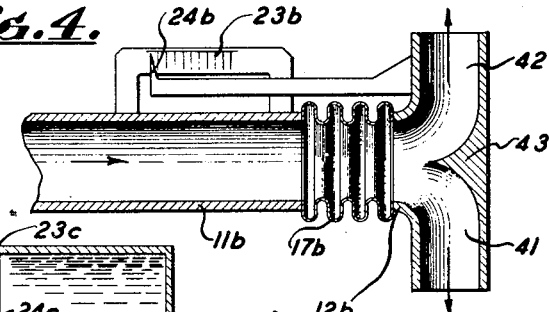
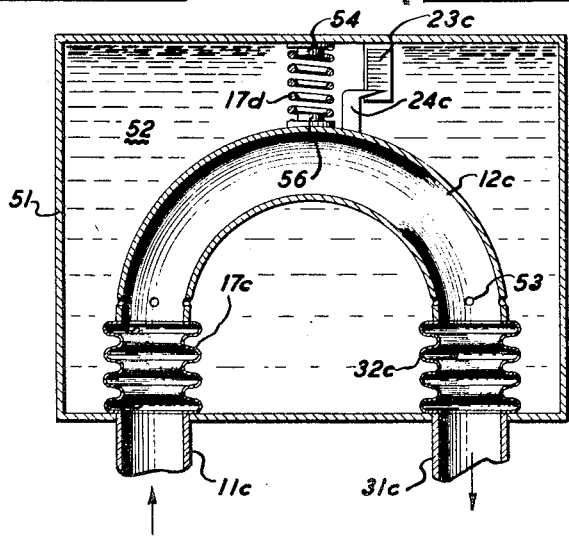
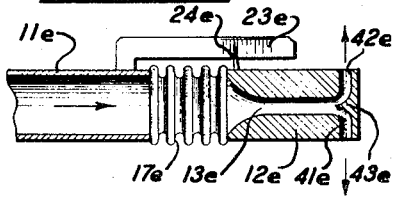
INVENTOR.
HORACE E. KARIG
BY M. C. Hayes
ATTORNEY Patented Jan. 23, 1951

2,538,785

UNITED STATES PATENT OFFICE 2,538,785

APPARATUS FOR MEASURING JET REACTION OF A NOZZLE

Horace E. Karig, Pasadena, Calif.

Application May 10, 1948, Serial No. 26,232

3 Claims. (Cl. 73—116)

(Granted under the act of March 3, 1883, as amended April 30, 1928; 370 O. G. 757)

This invention relates to a measuring device, and more particularly to a device for measuring characteristics of flowing fluid.

Exemplary uses for this invention are: as a flow meter for measuring the velocity or rate of flow of a fluid in a conduit; for measuring the density or viscosity of a flowing fluid whose velocity is known; and for measuring the jet reaction of a stream of fluid ejected from a nozzle.

It is an object of this invention to provide an improved apparatus for measuring the rate of flow of fluid through a conduit.

It is another object of this invention to provide apparatus for simplifying the measurement of jet reaction of a stream of fluid issuing forth from a nozzle.

It is a further object of this invention to provide apparatus for measuring characteristics of fluid flow without decreasing the energy in the fluid flow and without creating a turbulence in the flow.

It is an object of this invention to provide apparatus for measuring characteristics of fluid flow in which the flow of the fluid is maintained at all times in a smooth and streamlined path, relatively free of turbulence and irregularity.

Other objects and many of the attendant advantages of this invention will be readily appreciated as the same becomes better understood by reference to the following description.

The apparatus of this invention comprises generally a fluid conduit which directs a stream of fluid in a predetermined direction. Means effective to change the velocity of the fluid stream is movably mounted with respect to the conduit and disposed in the stream of fluid. This change in velocity may be either a change in the magnitude of the velocity, or in its direction, it being remembered that velocity is a vector quantity. Furthermore, this change in velocity is effected with little or no loss in energy by the flowing fluid. That is to say, the change in velocity is achieved with a minimum of turbulence so that there is little entropy drop during the change, and there is consequently little loss in the sum of the potential and kinetic energies of the fluid. The change in velocity effected by the velocity changing means results in a force being applied to the means with only negligible drop in entropy of the flowing fluid. Means is provided for measuring the force exerted between the velocity changing means and the conduit by the change in velocity, which force is a direct function of the original velocity of the flowing fluid.

The apparatus preferably includes another conduit disposed downstream of the first conduit in end-to-end relation thereto for the passage of fluid from the upstream conduit to the downstream conduit. The velocity changing means is mounted in the downstream conduit, which is in turn mounted for relative movement with respect to the upstream conduit along a line paralleling the axis of the upstream conduit. The means for measuring the separating force exerted between the two conduits by the change in velocity conveniently takes the form of a biasing means which tends to urge the two conduits together, and a means for measuring the separation effected between the two conduits by the change in fluid velocity.

The velocity changing means of the instant invention preferably consists of some type of wall means which is disposed in the path of the fluid stream to smoothly divert the same without creating turbulence, which would result in the loss of flow or pressure energy and consequent drop in entropy.

Three species of the instant invention have been illustrated, and will be described hereinafter. The first and preferred species is one in which the velocity changing wall means forms a constriction for fluid flow, which increases the velocity of the fluid, and thereby creates a separating force tending to move the wall means downstream of the upstream conduit. This constriction forming means preferably consists of a nozzle through which the fluid flows, the nozzle constituting substantially the downstream conduit, described hereinbefore. The change in velocity produced in the nozzle species of the instant invention is a change in magnitude, wherein the linear speed of the flowing fluid is increased. This increase in velocity transmutes some of the upstream potential or pressure energy of the fluid into kinetic energy, and the resulting differential in pressure across the two faces of the nozzle produces the force which is measured to indicate the magnitude of the fluid flow. This is in accordance with the well-known Bernoulli effect.

The second species illustrated hereinafter changes not the magnitude of the velocity, but its direction, this change in direction likewise producing a measurable force on the velocity changing wall means, in accordance with the well-known Newton law: $F = d(MV)/dt$. In this second species the velocity changing, wall diverting means comprises a bend in the downstream conduit, which is effective to turn the fluid stream to a direction different from that with which it left the first conduit.

The third species employs the concepts of both the first and the second species simultaneously.

Particular embodiments of the instant invention have been illustrated in the accompanying drawing, wherein:

Fig. 1 is a longitudinal cross section of one form of the first and preferred species of the invention;

Fig. 2 is a cross section taken along line 2—2 of Fig. 1;

Fig. 3 is a longitudinal section of another form of the first species of the instant invention;

Fig. 4 illustrates a form of the second species of the instant invention, and is a longitudinal section taken along the axis thereof;

Fig. 5 is a longitudinally sectioned view of another form of the second species of the instant invention; and Fig. 6 is a longitudinal section of the third species.

*First species—first form*

Referring to Fig. 1, 11 designates a fluid conduit located in upstream position. Means are disposed in the fluid stream of the conduit 11 which is effective to change the velocity of the stream. In Fig. 1, this means assumes the form of a downstream conduit 12, slidably mounted in alignment with the conduit 11, and including a velocity changing, wall diverting means in the form of a nozzle 13, which is secured in the discharge end of the downstream conduit 12.

The outer surface of the conduit 12 which slides telescopically within the conduit 11 is provided with a pair of circumferential grooves 14, in which are disposed sealing rings 16, serving to prevent leakage of fluid from the two conduits while permitting telescoping thereof. The conduit 12 is biased in an upstream direction, that is to say, toward the conduit 11, by means of a helical spring 17 positioned circumjacent the conduits, and compressed between a shoulder 18 on the extreme end of the conduit 11 and a ring 19 connected to the conduit 12 by means of four rods 21 disposed parallel to the axis of the conduit and secured between the ring 19 and a flange 22 on the outer end of the conduit 12 circumjacent the nozzle 13. From the description thus far, it will be seen that the conduit 12 including the nozzle 13, is free to slide axially within the conduit 11, but is biased in an upstream direction by the compressed spring 17, which thus biases the two conduits together.

Means is provided for measuring the relative separation between the two conduits 11 and 12, this means taking the form of a scale member 23 secured longitudinally to the exterior of the conduit 11 and co-operating with a pointer 24 extending outwardly from the ring 19. The pointer 24 and scale 23 thus co-operate with the spring 17 to constitute a simple and convenient means for measuring the force tending to separate the two conduits 11 and 12.

It will thus be seen that the assembly of Fig. 1 constitutes simply a nozzle slidably mounted on the conduit which it terminates, and means for measuring the fluid force which tends to push the nozzle away from the conduit.

The functioning of the device of Fig. 1 is substantially as follows:

In accordance with the well-known Bernoulli effect, the nozzle 13 tends to transmute a portion of the potential or pressure energy of the fluid into flow or kinetic energy, by increasing the velocity. A pressure differential is thus established between the interior 26 of the nozzle 13 and the exterior 27 thereof.

The force tending to separate the conduits 11 and 12 against the bias of the spring 17 can be shown to be represented by the following equation:

$$F = \Delta P A_c - JR$$

Where:

F—force tending to separate conduits 11 and 12
$\Delta P$—differential static pressure between the regions 26 and 27
$A_c$—cross sectional area of the downstream conduit 12 at its point of connection with the upstream conduit 11, i. e. the area corresponding to the diameter D in Fig. 1
JR—the jet reaction force of the ejected stream against the entire assembly on which the conduit 11 is mounted.

$\Delta P$ may easily be determined by inserting known measuring means 25 into the conduit 11 to measure the static pressure at 26. Pressure at 27 is known to be atmospheric. The cross sectional area $A_c$ at D is easily determined. It is therefore seen that the instant invention embodies a very simple manner for measuring the jet reaction of the fluid stream issuing from the nozzle 13, inasmuch as all the factors entering into the above equation may be easily determined, for the purpose of finding the jet reaction, JR.

It may also be easily shown that, in the case of a liquid, the quantity of fluid flowing through the two conduits may be expressed by the following relation:

$$Q = K_1 \sqrt{\Delta P / d}$$

Where:

Q—quantity of fluid flowing through the conduits per unit of time
$K_1$—a constant determined by the nature of the orifice means or nozzle 13
d—density of fluid It can also be readily shown that the jet reaction, JR is:

$$JR = K_2 \Delta P$$

Where: $K_2$—another constant also dependent on the configuration of the nozzle 13.

From this it follows that the quantity Q can be expressed as:

$$Q = K_3 \sqrt{F/d}$$

Where: $K_3$—another constant, which is a function solely of the configuration of the assembly, including the nozzle 13 and the area of the conduit 11.

It will thus be seen that, for a known assembly 11, 12, 13, the force measured on the scale member 23 is a direct function of the quantity of liquid ejected per unit time from the nozzle 13. When the fluid is a gas, the relation is more complex, being expressed generally as:

$$Q = K_4 f(F/d)$$

Where: $K_4$—another constant which, like $K_3$, is a function of the configuration of the assembly.

The particular function, $f(F/d)$ is different for each different gas, and may be determined by calculations.

The apparatus of Fig. 1 thus forms a simple and convenient means for measuring the jet reaction exerted by the stream ejected from the nozzle 13, irrespective entirely of the nature or configuration of the nozzle, which may be unknown to the observer. The apparatus of Fig. 1 also forms a convenient way for measuring directly the quantity of fluid flowing through the nozzle member 13 when the nature and configuration of the nozzle 13 are known. In such a case the scale 23 may be marked directly in terms of Q.

Summarizing, the operation of the apparatus shown in Fig. 1 is as follows: fluid flowing from the conduit 11 into the conduit 12 is diverted into a narrow stream by the constricting action of the nozzle 13, which increases the stream velocity. This creates a pressure differential between the regions 26 and 27, which pressure differential causes a separating force to be exerted between the conduits 11 and 12. This force is a direct function of the quantity of fluid flowing through the conduits for any given apparatus; and further is a measure of jet reaction of the stream ejected from the nozzle 13, irrespective of nozzle characteristics, which may in some instances be unknown or difficult of determination.

*First species—second form*

In the embodiment of the first species shown in Fig. 3, the apparatus functions substantially the same as that shown in Fig. 1, the principal difference being that instead of discharging to atmosphere and creating a conventional jet reaction, the fluid is retained within another conduit 31, and continues on its way under control. The functioning of the two devices is otherwise identical, in that the pressure differential which creates the force measured on a scale 23a results from the diversion of the fluid which increases its velocity and creates a pressure differential in accordance with the Bernoulli effect.

Corresponding parts between Figs. 1 and 3 have been designated by the same numerals followed by the letter "a." It will be noted that in the Fig. 3 modification, the conduit 12 of Fig. 1 has been completely merged into the nozzle 13, to become simply an annular nozzle member 13a which carries the pointer 24a. It will be further noted that the functions fulfilled by the sealing rings 14 and the spring 17 of Fig. 1 have been combined in the spring bellows 17a of Fig. 3, which serves not only to prevent leakage of fluid from the pipe, but also tends by its resiliency to bias the member 13a toward the conduit 11a against the separating force exerted by the flowing fluid between the member 13a and the conduit 11a. Since it is preferred to rigidly mount both the conduit 11a and the pickup conduit 31, the function of the bellows 17a in its biasing operation is supplemented by a second resilient bellows 32 which serves as a connection between the outlet side of the nozzle member 13a and the rigidly mounted downstream conduit 31. The resiliencies of the bellows 17a and 32 combine to form the bias function fulfilled by the spring 17 of the Fig. 1 embodiment.

The downstream conduit 31 includes a diffuser section in the form of an outwardly flaring annular member 33 mounted within the conduit 31 with its narrow mouth close to the orifice of the nozzle 13a. This section serves to smoothly slow down the fluid jet without turbulence, thereby rechanging the energy from kinetic energy back to pressure energy without significant drop in entropy.

The functioning of the apparatus shown in Figs. 1 and 3, respectively, is for all intents and purposes identical, and for that reason these two figures are submitted as illustrative of the first species of this invention.

*Second species—first form*

The second species of this invention is illustrated in Figs. 4 and 5, the first figure showing a preferred form of this second species.

In Fig. 4 the upstream, rigidly mounted conduit 11b, carrying a scale member 23b is connected in end-to-end relation with a downstream conduit 12b by means of a resilient metal bellows 17b. The conduit 12b is bifurcated into a generally T-shaped configuration through the provision of two outlet or discharge conduits 41 and 42 which discharge fluid in streams disposed symmetrically with respect to the axis of the upstream conduit 11b. A protruding, wedge-shaped wall 43 is formed at the intersection of the two conduits 41 and 42 to split the fluid flow smoothly and without turbulence into two streams and change the flow direction from a line coincident with the axis of the upstream conduit 11b, to a line perpendicular thereto.

It being recalled that velocity is a vector quantity, it will be seen that the bifurcation of the downstream conduit 12b serves to change the velocity of the fluid passing from the upstream conduit 11b, just as the nozzle 13 of Fig. 1 changes the velocity of the fluid, the difference being that in the case of Fig. 1 the magnitude of the velocity is changed to create a pressure differential, whereas in the case of Fig. 4 the direction of the velocity is changed. This direction change also produces a force tending to separate the conduit 12b from the conduit 11b in accordance with the well-known relation:

$$F = d(MV)/dt$$

Where:

F—force tending to separate the two conduits
MV—momentum of flowing fluid
t—time While the magnitude of the momentum is substantially unchanged, and hence the total energy of the flowing fluid is undiminished, the direction of the momentum is changed from a line coincident with the axis of the conduit 11b to a line perpendicular to it, the net change in momentum producing a force vector on the downstream wall of the bifurcations 41 and 42 of the conduit 12b, which is aligned with the axis of the conduit 11b, and which tends to separate the two conduits 11b and 12b. This separation is resisted by the resiliency of the spring bellows 17b which tends to bias the two conduits 11b and 12b together, and the extent of the separation is measured by a pointer 24b, carried by the conduit 12b, and co-operating with a scale member 23b mounted to the conduit 11b.

It will be seen that while both the wall means shown in Fig. 1 and the wall means shown in Fig. 4 have the common attribute of diverting the flowing fluid, thereby to change the velocity thereof, the former produces the separating force by creating a pressure differential in accordance with the Bernoulli effect by increasing the velocity of the stream, while the latter produces the separating force by being formed as a bend in the downstream conduit which changes the direction of the momentum vector and thereby creates the separating force.

Second species—second form

Another form of the second species of the instant invention is illustrated in Fig. 5, wherein the upstream conduit 11c feeds a U-shaped downstream conduit 12c through a resilient metal bellows 17c, the conduit 12c in turn emptying into a pickup conduit 31c, connected thereto through a resilient bellows 32c. In the embodiment shown in Fig. 5 the momentum vector is swung through 180° instead of only 90° as in the case of the Fig. 4 embodiment, thereby doubling the force F exerted by a given rate of fluid flow in the conduit 11c. To accommodate for changes in static pressure within the conduit 12c, since it does not discharge directly to air as does the conduit 12b of Fig. 4, it is necessary to provide compensating means in the form of a container 51, forming a chamber 52 completely surrounding the U-shaped conduit 12c, and communicating therewith by apertures 53, which serves to transmit the static pressure from the conduit to the chamber 52 without being affected by the flow or kinetic energy due to the velocity of the stream in the conduit. The container 51 is rigidly secured to the conduits 11c and 31c, and serves as a mounting point for one end of a helical spring 17d which fortifies the resilient action of the bellows 17c and 32c in resisting the fluid force tending to separate the conduit 12c from the conduit 11c. The other end of the spring 17d presses against the outer face of the U-shaped conduit 12c. Studs 54 and 56 on the container 51 and the conduit 12c, respectively, which serve to center the spring 17c, also serve to center the conduit 12c in its back and forth movement within the chamber 52.

An arm 24c on the conduit 12c co-operates with a scale 23c on the container 51 to measure the extent of separation of the conduit 12c from the conduit 11c, due to the change in momentum vector, as the fluid flows around through the U-shaped conduit 12c.

Third species

The third species of the instant invention employs a constriction 13e (Fig. 6) to accelerate the flow, and while still accelerated splits and bends the stream by a T section consisting of branches 41e and 42e. Thus the separating force between the two conduits 11e and 12e is increased for a given flow, Q, by utilizing both types of velocity change.

All forms of the apparatus described hereinbefore may be very simply calibrated, either through static calibration means or by mathematical calculation, since the effect of the flowing fluid upon the appartus may be predicted very accurately by paper calculations in the nozzle species, Figs. 1, 2, and 3; in the bent-conduit species, Figs. 4 and 5; and in the combination species, Fig. 6.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Apparatus for measuring jet reaction of a nozzle comprising a conduit; a nozzle mounted telescopically on the end of said conduit and reciprocable with respect thereto along the axis of said nozzle, said nozzle having a streamlined restriction for smoothly accelerating fluid flow, said nozzle discharging to atmosphere, means biasing said conduit and nozzle together, means for indicating the separation force between said nozzle and said conduit due to said restriction, and pressure gage means communicating with said conduit adjacent said nozzle for measuring the static pressure applied to said nozzle.

2. Apparatus for measuring jet reaction of a nozzle comprising a conduit; a nozzle mounted telescopically on the end of said conduit and reciprocable with respect thereto along the axis of said nozzle, said nozzle having a streamlined restriction for smoothly accelerating fluid flow, said nozzle discharging to atmosphere, resilient means urging said nozzle and conduit together and resisting their separation, means for indicating the separation force between said nozzle and said conduit due to said restriction, and pressure gage means communicating with said conduit adjacent said nozzle for measuring the static pressure applied to said nozzle.

3. Apparatus for measuring jet reaction of a nozzle comprising a conduit; a nozzle mounted telescopically on the end of said conduit and reciprocable with respect thereto along the axis of said nozzle, said nozzle discharging to atmosphere, means biasing said conduit and nozzle together, means for indicating the separation force between said nozzle and said conduit, and pressure gage means communicating with said conduit adjacent said nozzle for measuring the static pressure applied to said nozzle.

HORACE E. KARIG.

REFERENCES CITED

The following references are of record in the file of this patent:

UNITED STATES PATENTS

| Number | Name | Date |
| --- | --- | --- |
| 1,401,299 | Wohlenberg | Dec. 27, 1921 |
| 1,416,220 | Long et al. | May 16, 1922 |
| 1,699,163 | Schiske | Jan. 15, 1929 |
| 1,819,138 | Trogner | Aug. 18, 1931 |
| 1,911,169 | Trogner | May 23, 1933 |
| 2,032,245 | Wotring | Feb. 25, 1936 |

FOREIGN PATENTS

| Number | Country | Date |
| --- | --- | --- |
| 251,194 | Great Britain | Apr. 29, 1926 |
| 215,355 | Germany | Oct. 26, 1909 |